(12) United States Patent
Prod'homme (10) Patent No.: US 9,778,306 B1
(45) Date of Patent: Oct. 3, 2017

(54) METHODS FOR ACCELERATED SOILING TESTING OF PHOTOVOLTAIC (PV) MODULES

(71) Applicant: Patricia Prod'homme, Palaiseau (FR)

(72) Inventor: Patricia Prod'homme, Palaiseau (FR)

(73) Assignee: Total Marketing Services, Puteaux (FR)

( * ) Notice: Subject to any disclaimer, the term of this patent is extended or adjusted under 35 U.S.C. 154(b) by 99 days.

(21) Appl. No.: 14/998,095

(22) Filed: Dec. 23, 2015

(51) Int. Cl.
| | |
|---|---|
| *G01R 31/10* | (2006.01) |
| *G01R 31/26* | (2014.01) |
| *G01R 31/00* | (2006.01) |
| *H02S 50/10* | (2014.01) |
| *G01R 31/02* | (2006.01) |

(52) U.S. Cl.
CPC ......... *G01R 31/003* (2013.01); *G01R 31/025* (2013.01); *H02S 50/10* (2014.12)

(58) Field of Classification Search
CPC . C09D 5/00; C09D 5/006; C09D 5/08; C09D 5/24; C09D 5/1662; C09D 5/1675; C03C 17/002; C03C 17/007; C03C 17/008; C03C 17/23; C03C 17/30
See application file for complete search history.

(56) References Cited

U.S. PATENT DOCUMENTS

| | | | |
|---|---|---|---|
| 9,608,563 B2* | 3/2017 | Carretero Batista ... | H02S 50/10 |
| 2013/0287966 A1* | 10/2013 | Sleiman ............... | C09D 7/1216 |
| | | | 427/558 |
| 2016/0359453 A1* | 12/2016 | Jones ..................... | H02S 50/00 |

OTHER PUBLICATIONS

Brown, Kathy, et al., "Soiling Test Methods and their Use in Predicting Performance of Photovoltaic Modules in Soiling Environments", 3M Corporation, IEEE PVSC, Photovoltaic Specialists Conference (PVSC), 2012 38th IEEE Jun. 2012 : MePVSC105, 5 pgs.

(Continued)

*Primary Examiner* — Minh N Tang
(74) *Attorney, Agent, or Firm* — Schwabe, Williamson & Wyatt P.C.

(57) ABSTRACT

Methods for accelerated soiling testing of PV modules is described herein. The methods accurately reproduce soiling characteristics across various environmental conditions and can be performed in a laboratory environment under short testing times. A method described herein comprises the steps of forming a soiling mixture, depositing the soiling mixture on a surface portion of a PV module, exposing the PV module surface portion to simulated environmental conditions and determining an extent of recovery of the PV module surface portion.

17 Claims, 5 Drawing Sheets

(56) References Cited

OTHER PUBLICATIONS

Burton, Patrick D., et al., "Artificial Soiling of Photovoltaic Module Surfaces using Traceable Soil Components", 39th IEEE PVSEC 2013, Sandia National Laboratories : Burton-2-SAND2013-4760C_PVSEC391, 4 pgs.

Jiang, Hai, et al., "Experimental investigation of the impact of airborne dust deposition on the performance of solar photovoltaic (PV) modules", Elsevier, Atmospheric Environment 45, (2011), 6 pgs.

Kaldellis, J. K., et al., "Simulating the dust effect on the energy performance of photovoltaic generators based on experimental measurements", Elsevier, Energy 36, (2011), 8 pgs.

Kaldellis, J. K., et al., "Systematic experimental study of the pollution deposition impact on the energy yield of photovoltaic installations", Elsevier, Renewable Energy 36 (2011), 8 pgs.

Klimm, Elisabeth, et al., "Functionality and durability tests for anti-soiling coatings on glass for solar energy applications", Glass Performance Days (GPD) Conference 2013 oral presentation: Fraunhofer GPD2013, 2 pgs.

\* cited by examiner

METHODS FOR ACCELERATED SOILING TESTING OF PHOTOVOLTAIC (PV) MODULES

BACKGROUND

Photovoltaic (PV) cells, commonly known as solar cells, are well known devices for direct conversion of solar radiation into electrical energy. Generally, solar cells are fabricated on a semiconductor wafer or substrate using semiconductor processing techniques to form a p-n junction near a surface of the substrate. Solar radiation impinging on the surface of, and entering into, the substrate creates electron and hole pairs in the bulk of the substrate. The electron and hole pairs migrate to p-doped and n-doped regions in the substrate, thereby generating a voltage differential between the doped regions. The doped regions are connected to conductive regions on the solar cell to direct an electrical current from the cell to an external circuit. Solar cells can be coupled together electrically (e.g., in series) to form a solar, or PV, module.

In operation, PV modules are exposed to the ambient atmosphere and can collect dust, dirt, or other particulates such that outer surfaces of the PV module become soiled. Soiled outer surfaces of the PV module can block solar radiation from reaching solar cells of the PV module, which can ultimately reduce the amount of energy produced by the PV module.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers. The figures are not drawn to scale.

DETAILED DESCRIPTION

The following detailed description is merely illustrative in nature and is not intended to limit the embodiments of the subject matter of the application or uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Terminology—the Following Paragraphs Provide Definitions and/or Context for Terms Found in this Disclosure (Including the Appended Claims)

This specification includes references to "one embodiment" or "an embodiment." The appearances of the phrases "in one embodiment" or "in an embodiment" do not necessarily refer to the same embodiment. Particular features, structures, or characteristics can be combined in any suitable manner consistent with this disclosure.

This term "comprising" is open-ended. As used in the appended claims, this term does not foreclose additional structure or steps.

Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. §112, sixth paragraph, for that unit/component.

As used herein, the terms "first," "second," etc. are used as labels for nouns that they precede, and do not imply any type of ordering (e.g., spatial, temporal, logical, etc.). For example, reference to a "first" encapsulant layer does not necessarily imply that this encapsulant layer is the first encapsulant layer in a sequence; instead the term "first" is used to differentiate this encapsulant from another encapsulant (e.g., a "second" encapsulant).

The terms "a" and "an" are defined as one or more unless this disclosure explicitly requires otherwise.

The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

As used herein, "inhibit" is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

As used herein, the term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage includes 0.1, 1, 5, and 10 percent.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

In the following description, numerous specific details are set forth, such as specific operations, in order to provide a thorough understanding of embodiments of the present disclosure. It will be apparent to one skilled in the art that embodiments of the present disclosure may be practiced without these specific details. In other instances, well-known techniques are not described in detail in order to not unnecessarily obscure embodiments of the present invention. The feature or features of one embodiment can be applied to other embodiments, even though not described or illustrated, unless expressly prohibited by this disclosure or the nature of the embodiments.

During operation, photovoltaic (PV) modules can become soiled by dust, dirt, or other particulates in the ambient atmosphere. In a soiled state, energy produced by the PV module can be drastically reduced due to soiled PV module outer surfaces blocking solar radiation from reaching solar cells of the PV module. The extent of soiling and associated soiling rate is a complex, multi-variable issue that is highly dependent on various climatic and environmental factors including wind, rain, humidity, pollution, soil type, land-use factors, seasonal variations, physico-chemical properties of the dust and PV module surface.

Accurate and representative soiling rates of PV modules under various environmental conditions can inform on expected power output and optimal surface coatings for a PV module in a particular environment and/or location. Some approaches require a long period of time (e.g. weeks) of outdoor exposure of test coupons and/or full PV modules to get an accurate understanding of soiling rates in various environments or locations. Herein, we disclose a method for accelerated soiling testing of PV modules and test coupons which accurately reproduces soiling characteristics across various environmental conditions and can be performed in a laboratory environment under short testing times.

Figure 1:
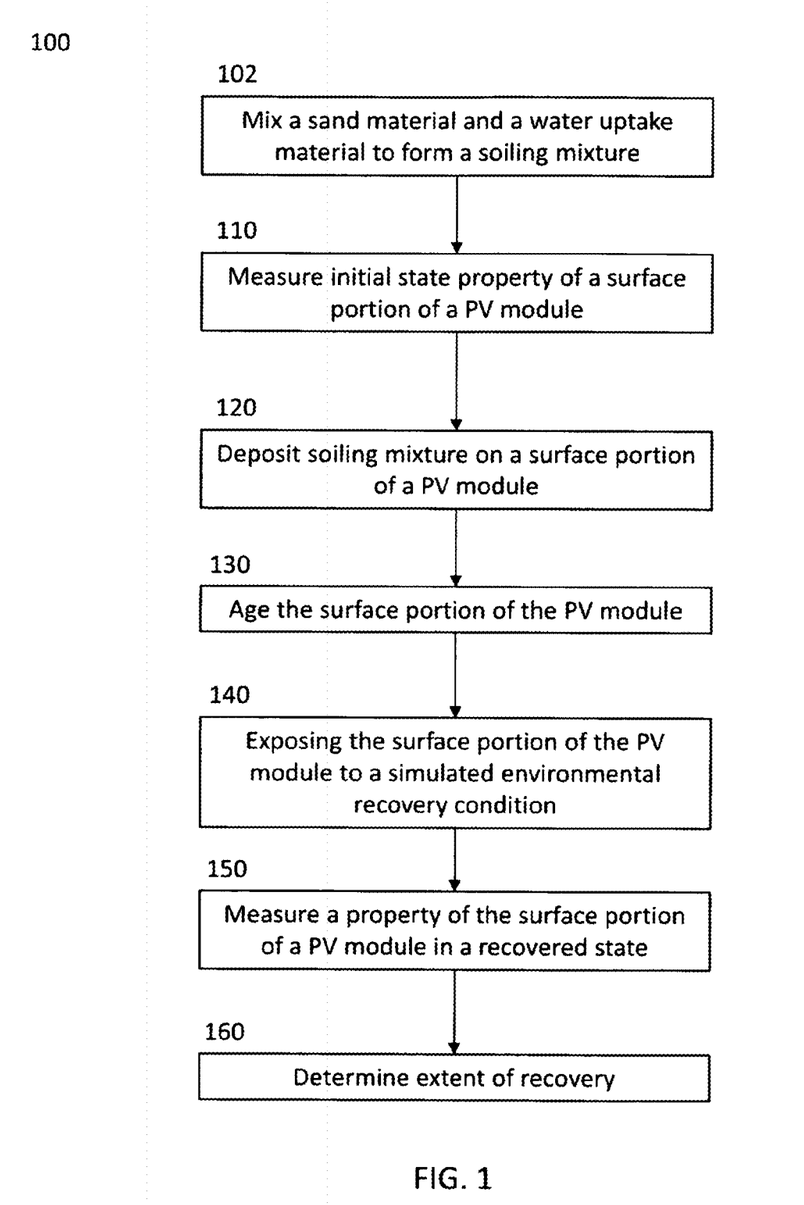
FIG. 1 depicts a flowchart of a method for accelerated soiling testing of PV modules according to an embodiment.

FIG. 1 exhibits a flowchart 100 of a method for accelerated soiling testing of PV modules and PV module surface portions according to an embodiment. The flowchart 100 comprises a step 102 for forming a soiling mixture by mixing a first percentage of a sand, or quartz, material and a second percentage of a water uptake material. In an embodiment, the percentages of each material are provided on a mass basis. At step 102, the sand material and the water uptake material can be separately weighed by a gravimetric scale. The sand material and the water uptake material can then be physically combined and mixed. Any desired mixing method can be employed including manual mixing by hand, dry mixing with blenders or orbital shakers, wet mixing with magnetic stirrers, or a combination thereof.

In an embodiment, the soiling mixture comprises at least two different components. The soiling mixture can comprise a sand material or a quartz material. Quartz can be silicate based materials, clay minerals are mainly phyllosilicates based materials (the core complex of a phyllosilicate is an infinite sheet of connected silica tetrahedrals) with various swelling ability. The soiling mixture can additionally comprise a water uptake material. The water uptake material can be an inorganic water uptake material or an organic water uptake material. As an example, the organic water uptake material can be humus which is the degradation of organic matter. The soiling mixture can further comprise impurities or binder materials, for example, fly ash, limestone, and/or cement.

In one embodiment, the water uptake material comprises an inorganic clay mineral. For example, the water uptake material can comprise a phyllosilicate, or sheet silicate mineral. The water uptake material can be a clay mineral selected from the group of kaolinite, montmorillonite, bentonite, illite, smectite, vermiculite, their derivatives or combinations thereof. In an embodiment, the water uptake material can be a swelling clay, or expansive clay. Not to be bound by any particular theory, but a swelling clay can be prone to large volume changes that are directly related to changes in water content. For example, clay interlayers can expand when hydrated such that the separation between individual sheets varies with the amount of water present.

Depending of the location, the proportion of the four components in the soiling mixture can be changed as desired. Not to be bound by any particular theory, but water in soils can be held either on the outside surface, adsorbed at the outer surface of particle between grains or particles of soil for example, inside interior pores, or within the interlayer of the crystalline of mineral particles. In some embodiments, water is also contained in organic uptake material e.g. organic matter or humus. The amount of water held in soil, or degree of water uptake of a soil material can depend on the porosity resulting from the size, shape of mineral particles on one size, and the chemical composition and the cation exchange properties and the arrangement of the sheet forming the clay minerals or phyllosilicate on the other side. The presence of organic matter or impurities can also increase the amount of water but is not necessary for the swelling properties of the soil. Organic matter or humus is composed of organic compounds originating from the remains of organisms such as plants, animals and their waste products in the environment. In one embodiment, organic matter containing water is added to the soiling mixture. In some embodiments, inorganic water uptake material is added to the soiling mixture separately from water.

Again not to be bound by any particular theory, but mineral particles can affect water uptake or water retention by determining the size and the shape and presence of inner pores and the crystalline structure (inner arrangement of sheet forming the clays minerals) and cation and anion exchange capacity and presence of cation with large hydration energies. For example, The water content as a function of humidity was greatly dependent on the interlayer cations present with water adsorption increasing with cation hydration energy, i.e., $Mg^{2+}>Ca^{2+}>Na^+$. This impact can be as high as the water retention by capillarity. For example, water can be held tighter in small pores than in large ones, so fine soils can hold more water than coarse soils. Soils with smaller particles (e.g. silt, clay) have a larger surface area than those with larger sand particles, and a large surface area allows a soil to hold more water. A soil mixture with a higher percentage of silt and/or clay particles, or fine soil, together with clay minerals will thus have a higher water-holding capacity or provides a greater degree of water uptake.

Non-limiting examples of water uptake materials include clay minerals, silt and organic matter containing water. Non-limiting examples of impurities or binder materials are ash, fly ash, limestone powder, and cement. The impurities or binder materials can have an adhesive or binder property, for example forming a paste. Not to be bound by any particular theory, but the water uptake material can swell with water, increase adhesive tack, or a combination thereof. In another embodiment, the BET surface area of the water uptake material can be 1-50 m$^2$/g. In one embodiment, the water uptake material comprises montmorillonite clay, kaolinite clay, or a combination thereof. For example, 200 Mesh (0-74 μm) montmorillonite clay can be mixed with a sand material to form the soiling mixture.

In an embodiment, the sand material is mainly composed of quartz or silicate (SiO2) of various size and shape. Non-limiting examples of the sand material include standard Arizona dust test sand like ISO12103-1 A1 Ultrafine (0-10 μm), ISO12103-1 A2 Fine (0-80 μm), ISO12 103-1 A3 Medium (0-80 μm with a lower 0-5 μm content than A2 Fine), or ISO12103 A4 Coarse (0-180 μm). In an embodiment, the sand material is comprises particle sizes less than 180 microns.

In an embodiment, the soiling mixture contains a first percentage of a quartz based material, or a sand material, and a second percentage of water uptake material, clay minerals based with more or less swelling ability. The relative percentages of the sand material and water uptake material can be varied depending on the location of study. For example, a sandy desert environment can be reproduced with a high percentage of sand material e.g. approaching 100% sand material in the soiling mixture. In contrast, a forested environment characterized by a high degree of clay in the soil can be reproduced with a high percentage of water uptake material e.g. approaching 100% of water uptake material. In one embodiment, the second percentage of the water uptake material is between 10% to 100% by weight.

In an embodiment, the soiling mixture contains a first percentage of a quartz based material, or a sand material, and a second percentage of water uptake material, clay minerals based and a third percentage of organic matter or binder material such as ash or limestone. The relative percentages of the sand material and water uptake material and organic matter or binder can be varied depending on the location of study.

Figure 2:
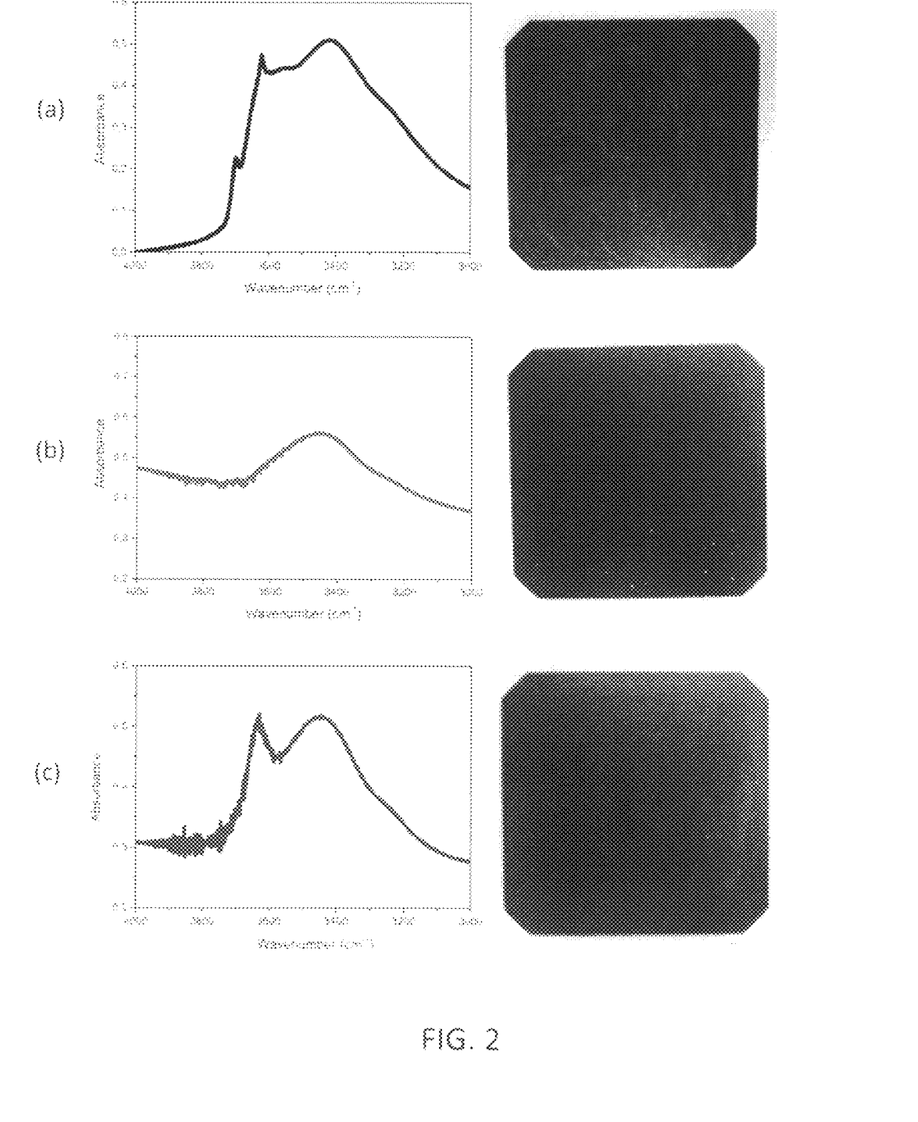
FIG. 2 exhibits infrared spectra and a photographs for PV module surface portions soiled by (a) a natural soil, (b) a sand material and (c) a soiling mixture comprising a sand material and a water uptake material according to an embodiment.

In some embodiments, the method comprises a step of measuring the absorption spectrum of the soiling mixture using infrared spectroscopy. For example, Fourier transform infrared spectroscopy (FTIR) can be used as a metric for adapting the composition of the soiling mixture to more accurately replicate natural soil or dust in a particular location. FIG. 2 depicts an infrared spectrum and a photograph of a manually soiled PV surface for (a) a natural soil, (b) a sand material and (c) a soiling mixture comprising a sand material and a water uptake material. In FIG. 2(a), the infrared spectrum of a natural soil from a location of interest is shown at left and a photograph of a PV cell soiled with the natural soil is shown at right. A sharp peak at approximately 3600 cm$^{-1}$ and a broad peak at approximately 3400 cm$^{-1}$ is observable in the infrared spectrum of the natural soil. In contrast, the infrared spectrum of the sand material in FIG. 2(b) has a single broad peak at approximately 3400 cm$^{-1}$. In FIG. 2(c), the infrared spectrum of the soiling mixture comprising the sand material and the water uptake material has peaks closely similar to the natural soil. In particular, a sharp peak at approximately 3600 cm$^{-1}$ and a broad peak at approximately 3400 cm$^{-1}$ are observed in the infrared spectra of the natural soil of FIG. 2(a) and the soiling mixture comprising the sand material and the water uptake material of FIG. 2(c). A broad peak at approximately 3400 cm$^{-1}$ can be related to hydroxide (OH) absorption and the intensity of the peak can depend on the amount of water in the soiling mixture. The photograph of the PV cell soiled with the natural soil at the right of FIG. 2(a) exhibits a tortuous soil incrustation which is relatively similar to the photograph of the PV cell soiled with the soiling mixture comprising the sand material and the water uptake material shown at the right of FIG. 2(c). In contrast, the photograph of the PV cell soiled with the sand material at the right of FIG. 2(b) exhibits a faint specked accumulation.

Other methods primarily use a sand material as a soiling medium without taking into account the effect of water uptake or water retention characteristics in soils. Some methods use fly ash mixed with a sand material as a soiling medium. As described herein, the selection of water uptake materials e.g. clay material with more or less swelling ability as a component of the soiling mixture provides an accurate representation of adhesive properties of natural soils in the presence of atmospheric water and the related soiling characteristics of PV modules.

Referring again to FIG. 1, an initial state property of a surface portion of a PV module is measured at step 110. A PV module can comprise a superstrate covering encapsulated PV cells on a substrate, or backsheet. The superstrate can comprise a substantially transparent cover made of glass or other substantially transparent material. The term "substantially transparent" is used herein to mean transmission of light through the region of material can be greater than 80% for light in the ranges of 200-1200 nm. In certain embodiments, the material of the superstrate, or transparent top cover, is selected for properties which minimize reflection, thereby permitting the maximum amount of sunlight to pass therethrough. In some embodiments, the superstrate comprises an anti-reflective coating (ARC) and/or an anti-soiling coating (e.g. hydrophilic or hydrophobic coating). In one embodiment, a section of the superstrate, for example a glass slide comprising a surface coating, can be used as a test coupon representing the surface portion of a PV module. In other embodiments, a single PV cell test coupon comprising a PV cell encapsulated between a glass cover and a backsheet can be used as the surface portion of the PV module. In yet another embodiment, a section of the superstrate on a reference single PV cell test coupon can be used as the surface portion of a PV module. Any desired material, structure, system or sub-system can be used as the surface portion of a PV module for testing, but should be as closely similar to a PV module of interest. In an embodiment, steps 102 and 110 can be performed simultaneously (e.g., at least overlapping in time) or separately.

At step 110, the initial state property of the surface portion of a PV module can be determined from an optical measurement, an electrical measurement, or a combination thereof. In some embodiments, the surface portion of a PV module is a glass test coupon placed on top of an PV cell. At step 110, the surface portion of a PV module can be cleaned by any desirable method. In one embodiment, an electrical property of the PV module surface portion is measured. For example, the initial state property can be a current-voltage (I-V) curve and/or short-circuit measurement. An I-V curve shows the possible combinations of current and voltage output of a PV cell or module. A PV cell or module produces a maximum current when there is no resistance in a circuit connecting a positive and negative terminal of the PV cell or module, i.e., when there is a short circuit between the positive and negative terminals. This maximum current, occurring when voltage in the circuit is zero, is known by those skilled in the art as the short circuit current $I_{sc}$. In one embodiment, positive and negative terminals associated with the surface portion of a PV module are electrically connected to an ammeter so that the current flows through the ammeter. During the measurement, the short-circuit current is measured with the surface portion of the PV module receiving reproducible light exposure.

In some embodiments, the initial state property of the PV module surface portion can be determined from an optical measurement. For example, optical properties such as light transmittance, reflectance and/or gloss can be measured with a photometer, spectrometer and/or glossmeter. In other embodiments, visual inspection can be employed to characterize the state of the PV module surface portion.

At step 120 of flowchart 100 in FIG. 1, the soiling mixture is deposited on the surface portion of a PV module. In some embodiments, the PV module surface portion is cleaned before deposition of the soiling mixture, for example by manual wiping with a tissue or cloth which can facilitate spreading of the soiling mixture within any surface irregularities or roughness. In one embodiment, the soiling mixture is spread on the PV module surface portion with an applicator. The amount of the soiling mixture to be deposited on the PV module surface portion can be measured (e.g. gravimetrically). For example, a predetermined mass of the soiling mixture can be deposited on various samples or test coupons to maintain consistent testing conditions. To accurately compare test coupons and conditions, the same predetermined amount of soiling mixture is spread on the test coupon. For example, the applicator can be a fabric to increase the penetration of the mixture within the porosity or surface roughness of the surface of the PV module as opposed to simply blowing the soiling mixture on the surface.

The PV module surface portion can be in a dry state or a partially wet state during or before spreading. For example, the PV module surface portion can be dried in an oven to produce an initial dry state. As another example, the PV module surface portion can be cooled in a freezer or refrigerator to produce an initial wet, partially wet, or dewed state. Under some testing conditions, the PV module surface portion is tested both in an initial dry state and an initial partially wet, or dewed state to mimic various outdoor conditions. Accordingly, the PV module surface portion can be characterized by an initial degree of surface dryness from dry to wet. In the case where an initially wet or dewed state is desired, a first fraction of the soiling mixture can be spread on the PV module surface portion in a dried state and a second fraction of the soiling mixture can be spread on PV module surface portion after a dewed state is produced by cooling in a freezer or refrigerator. Any desired amount of the soiling mixture can be spread on the PV module surface portion which can depend on the surface area of the PV module surface portion. For example, less than 50 mg of soiling mixture can be spread on a surface area of approximately 100 cm$^2$.

In an embodiment, a soiled state property of the surface portion of a PV module can be determined from an optical measurement, an electrical measurement, or a combination thereof. For example, an electrical property (e.g. short-circuit current) is measured for the PV module surface portion after the soiling mixture is deposited at step 120. In some embodiments, the soiled state property of the surface portion of a PV module can be considered as an initial state to which subsequent states can be compared. The soiled state property of the surface portion of a PV module can be compared to the PV module in the aged state and/or the recovered state.

At step 130 of flowchart 100 in FIG. 1, the surface portion of the PV module is aged by exposing the PV module surface portion to a simulated environmental aging condition. During aging, the PV module surface portion comprising the soiling mixture experiences an accelerated range of outdoor environmental conditions over a short testing period e.g. less than 48 hours. In one embodiment, the simulated environmental aging condition simulates dry environmental conditions. For example, the PV module surface portion is placed into a climatic chamber at low relative humidity e.g. <50% RH. As another example, the PV module surface portion is placed into a climatic chamber at low relative humidity e.g. <30% RH and 60° C. In another embodiment, the simulated environmental aging condition simulates wet environmental conditions. For example, the surface portion of the PV module is placed into a climatic chamber at a high relative humidity e.g. <50% RH. As yet another example, the PV module surface portion is placed into a climatic chamber a high relative humidity e.g. >50% RH and 60° C. The desired relative humidity and temperature used in testing can be chosen based on the location and environment being studied.

In on embodiment, an aged state property of the surface portion of a PV module can be determined from an optical measurement, an electrical measurement, or a combination thereof. For example, an electrical property (e.g. short-circuit current) is measured for the PV module surface portion after aging at step 130.

At operation step 140 of FIG. 1, the surface portion of a PV module is exposed to a simulated environmental recovery condition to resulting in the PV module surface portion being in a recovered state. The simulated environmental recovery conditions can mimic environmental wind conditions, rain conditions, and/or dew formation conditions in an accelerated testing time period. In an embodiment, the simulated environmental recovery condition simulates a windy environmental condition. For example, the PV module surface portion is placed in the pathway of an air stream produced by a fan or blower at a predetermined speed. In another embodiment, the simulated environmental recovery condition simulates a rainy environmental condition. For example, the PV module surface portion is sprayed with a misting nozzle at a predetermined distance from the surface portion. In yet another embodiment, the simulated environmental recovery condition simulates a dew event. For example, the PV module surface portion is placed inside a freezer, an environmental chamber at a high relative humidity e.g. >80% RH, or a combination thereof. As another example, a simulated dew event can be produced by placing the PV module surface portion in a climatic chamber at a temperature slightly above the dew point and at a high humidity e.g. >90% RH.

In on embodiment, the surface portion of the PV module is exposed to a series of simulated environmental recovery conditions. For example, at step 140, the PV module surface portion can be exposed to a simulated windy condition followed by a simulated rainy condition. As another example, the PV module surface portion can be exposed to a simulated windy condition, a simulated dew event and a simulated rain event. Depending on the desired weather pattern to be simulated, any number of conditions in any desired order can be performed. Measurements before and after any desired aging or recovery condition can be measured. Measurements at any state of the PV module surface portion can be compared to any other previous state that the PV module test coupon was in. It can be desirable to expose different PV module surface portions to the same simulated weather pattern. For example, to examine different surface coatings for PV modules, different surface portion test coupons can be coated with hydrophilic materials, hydrophobic materials, or a combination thereof. Each surface portion test coupon comprising a unique surface coating can be exposed to the same environmental conditions and a unique extent of recovery can be determined.

In some embodiments, the surface portion of the PV module is tilted to a predetermined degree from horizontal during a simulated environmental aging condition, a simulated environmental recovery condition or a combination thereof. For example, during a simulated windy environmental condition, the PV module surface portion is tilted 20 degrees from horizontal while in the pathway of an air stream produced by a fan. Tilting of the PV module surface portion can more accurately simulate the configuration of a PV module operating in the field. For example, a predetermined tilt angle is selected to simulate a position in the field and allow water from condensation events to remove soil from the surface of the PV module.

In some embodiments, exposure to a simulated environmental aging condition and a simulated recovery condition can be cyclic. For example, the surface portion of the PV module can be exposed to a simulated environmental aging condition at step 130 followed by a simulated environmental recovery condition at step 140. The PV module surface portion can then be exposed to a simulated environmental aging condition again at step 130 followed by a simulated environmental recovery condition at step 140.

At step 150 of flowchart 100 in FIG. 1, a recovered state property of a surface portion of a PV module is measured. Similar to step 110, the recovered state property of the surface portion of a PV module can be determined from an optical measurement, an electrical measurement, or a combination hereof. In one embodiment, an electrical property of the surface portion of the PV module is measured. For example, the recovered state property can be an I-V curve and/or short-circuit measurement. For comparison, it is desirable to measure the same type of property for both the PV module surface portion in the initial state at step 110 and the PV module surface portion in the recovered state at step 150.

At step 160 of flowchart 100 in FIG. 1, an extent of recovery of the PV module surface portion is determined. In one embodiment, the extent of recovery is determined from a comparison of the short-circuit current measurement of the PV module surface portion in the initial state and the short-circuit current measurement of the PV module surface portion in a recovered state. As an example, a difference between the initial short-circuit current ($I_{sc,initial}$) and the recovered short-circuit current ($I_{sc,recovered}$) is divided by the initial short-circuit current ($I_{sc,initial}$) to define a normalized % Isc difference as shown in Equation 1.

$$\text{normalized \% Isc difference} = \frac{I_{sc,initial} - I_{sc,recovered}}{I_{sc,initial}} \quad \text{Eq. 1}$$

The normalized % Isc difference is zero for a complete recovery of the surface portion of a PV module. A higher normalized % Isc difference signifies a lower extent of recovery.

In various embodiments, the method of FIG. 1 can include additional (or fewer) blocks than illustrated. For example, the method of FIG. 1 can further include measuring a property of the PV module surface portion after deposition of the soiling mixture at step 120 and/or measuring a property of the PV module surface portion after aging at step 130. In such an embodiment, the initial short-circuit current (Isc, initial) measured at step 110, the short-circuit current measured after soiling at step 120 (Isc, soiled), the short-circuit current measured after aging at step 130 (Isc, aged), and the recovered short-circuit current measured at step 150 (Isc, recovered) can be compared to determine an extent of recovery at different stages of the method.

In an embodiment, reference properties for a reference PV module surface portion in a cleaned state can be measured contemporaneously with measurements for a PV module surface portion in any desired state. For example, the use of a reference PV module surface portion can avoid potential testing differences due to measurement shifts from one day to another, for example due to changes related to test equipment or positioning of test coupons. As one example, all property measurements can be divided by the reference measurement, thereby normalizing all data.

FIG. 1 depicts a flowchart illustrating a method for accelerated soiling testing of PV modules and PV module surface test coupons according to an embodiment. Unless otherwise designated, the steps of FIG. 3 are similar to those described above with reference to FIG. 1, except that they have been incremented sequentially by 100.

Figure 3:
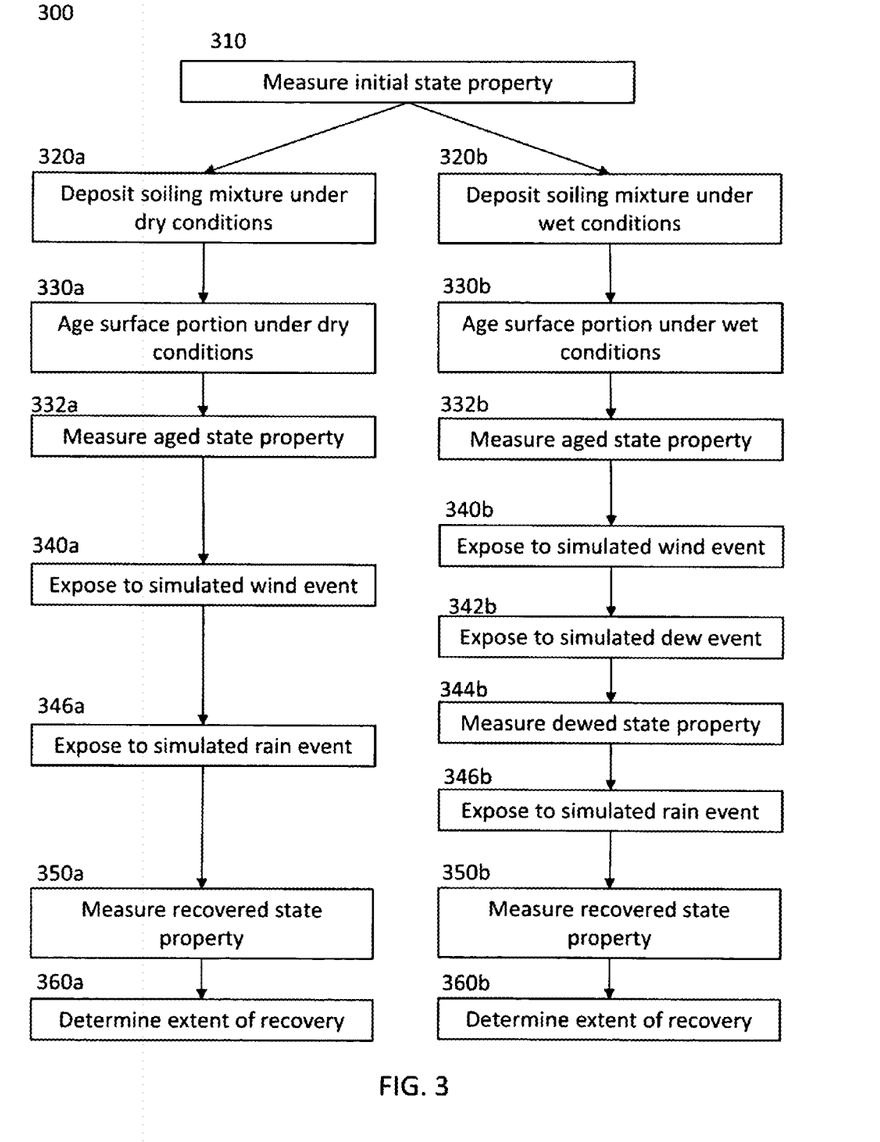
FIG. 3 depicts a flowchart illustrating a method for accelerated soiling testing of PV modules according to an embodiment.

At step 310 of flowchart 300 in FIG. 3, an initial electrical property, for example an initial short-circuit (Isc, initial), for a first and a second PV module surface portion is measured. In flowchart 300 of FIG. 3, a first PV module surface portion is tested under dry conditions (operation steps labeled with a) and a second PV module surface portion is tested under wet conditions (operation steps labeled with b) to mimic two different outdoor conditions. At step 320a, a predetermined amount of soiling mixture is deposited on the first PV module surface portion under dry conditions. Under dry conditions, the first PV module surface portion is prepared by drying the surface portion to produce an initial dry surface state. For example, the first PV module surface portion is dried with a tissue and the soiling mixture is spread on the surface. Under wet conditions, the second PV module surface portion is prepared by wetting the surface portion to produce an initial wet surface state. At step 320b, the second PV module surface portion is cooled in a freezer and/or humid chamber (or any closed environment below the dew point to get condensation on the surface) to produce an initial wet state and the soiling mixture is spread on the second surface portion.

At step 330a in FIG. 3, the first PV module surface portion is exposed to a simulated dry environmental aging condition. For example, the first PV module surface portion is placed into a climatic chamber at approximately 60° C. and 20% RH for 24 hours. At step 330b in FIG. 3, the second PV module surface portion is exposed to a simulated wet environmental aging condition. For example, the second PV module surface portion is placed into a climatic chamber at approximately 60° C. and 85% RH for 24 hours.

At step 332a in FIG. 3, an electrical property of the first PV module surface portion in an aged state is measured. At step 332b in FIG. 3, an electrical property of the second PV module surface portion in an aged state is measured. For example, a short-circuit current in the aged state (Isc, aged) for both the first and second PV module surface portions are measured.

In FIG. 3, the first surface portion of a PV module can be exposed to a simulated dry environmental recovery condition. At operation step 340a of flowchart 300, the first PV module surface portion is exposed to a simulated windy condition by placing the surface portion in the pathway of an air stream produced by a fan. At operation step 346*a* of FIG. 3, the first PV module surface portion is exposed to a simulated rainy condition by spraying water at the surface portion with a misting nozzle.

In FIG. 3, the second surface portion of a PV module is exposed to a simulated wet environmental recovery condition. At operation step 340*b* of flowchart 300, the second PV module surface portion is exposed to a simulated windy condition by placing the second PV module surface portion in the pathway of an air stream produced by a fan. At operation step 342*b*, the second PV module surface portion is exposed to a simulated dew event by placing the second PV module surface portion into a climatic chamber at approximately 25° C. and 98% RH for 12 hours. At step 344*b*, a short-circuit current of the second PV module surface portion after the simulated dew event (Isc, dew) is measured. At operation step 346*b*, the second PV module surface portion is exposed to a simulated rainy condition by spraying water at the second surface portion with a misting nozzle.

At step 350*a* of flowchart 300 in FIG. 3, an electrical property of the PV module surface portion, for example a short-circuit current, is measured. At step 350*b*, an electrical property of the second PV module surface portion, for example a short-circuit current, is measured. In an embodiment, the short-circuit current measurements at steps 350*a* and 350*b* are referred to short-circuit current measurements in the recovered state after a simulated rain event (Isc, rain).

The extent of recovery can be calculated in any desired manner. As a non-limiting example, the extent of recovery can be as a normalized % difference in measurement. For example, depending on the desired environment and conditions to be studied, the normalization can be changed to focus on particular elements such as type of soil type or testing conditions. As an example, the color of dust may be different from one test condition to another, so measurements can be normalized based on the initial state and/or soiled state.

At step 360*a* of flowchart 300 in FIG. 3, an extent of recovery of the first PV module surface portion is determined. At step 360*b*, an extent of recovery of the second PV module surface portion is determined. The extent of recovery can be expressed as a normalized % short-circuit current (Isc) difference. The normalized % Isc difference in an aged state is calculated from the difference between the initial short-circuit current ($I_{sc,\ initial}$) and the aged short-circuit current ($I_{sc,\ aged}$) divided by the initial short-circuit current ($I_{sc,\ initial}$) as shown in Equation 2.

$$\text{normalized \% Isc difference (aged)} = \frac{I_{sc,initial} - I_{sc,aged}}{I_{sc,initial}} \qquad \text{Eq. 2}$$

The normalized % Isc difference in a recovered state is calculated from the difference between the initial short-circuit current ($I_{sc,\ initial}$) and the recovered short-circuit current ($I_{sc,\ rain}$) divided by the initial short-circuit current ($I_{sc,\ initial}$) as shown in Equation 3.

$$\text{normalized \% Isc difference (recovered)} = \frac{I_{sc,initial} - I_{sc,aged}}{I_{sc,initial}} \qquad \text{Eq. 3}$$

For the second PV module surface portion, a normalized % Isc difference after the simulated dew event can be calculated from the difference between the initial short-circuit current ($I_{sc,\ initial}$) and the dewed short-circuit current ($I_{sc,\ dew}$) divided by the initial short-circuit current ($I_{sc,\ initial}$) as shown in Equation 4.

$$\text{normalized \% Isc difference (dew)} = \frac{I_{sc,initial} - I_{sc,aged}}{I_{sc,initial}} \qquad \text{Eq. 4}$$

In an embodiment, the disclosed method can be used to determine optimal surface coatings for PV modules operating in an outdoor environment. For example, PV module surface portion test coupons can be coated with hydrophilic materials, hydrophobic materials, or a combination thereof. Each surface portion test coupon comprising a unique surface coating can be exposed to the same environmental conditions and a unique extent of recovery can be determined.

Figure 4:
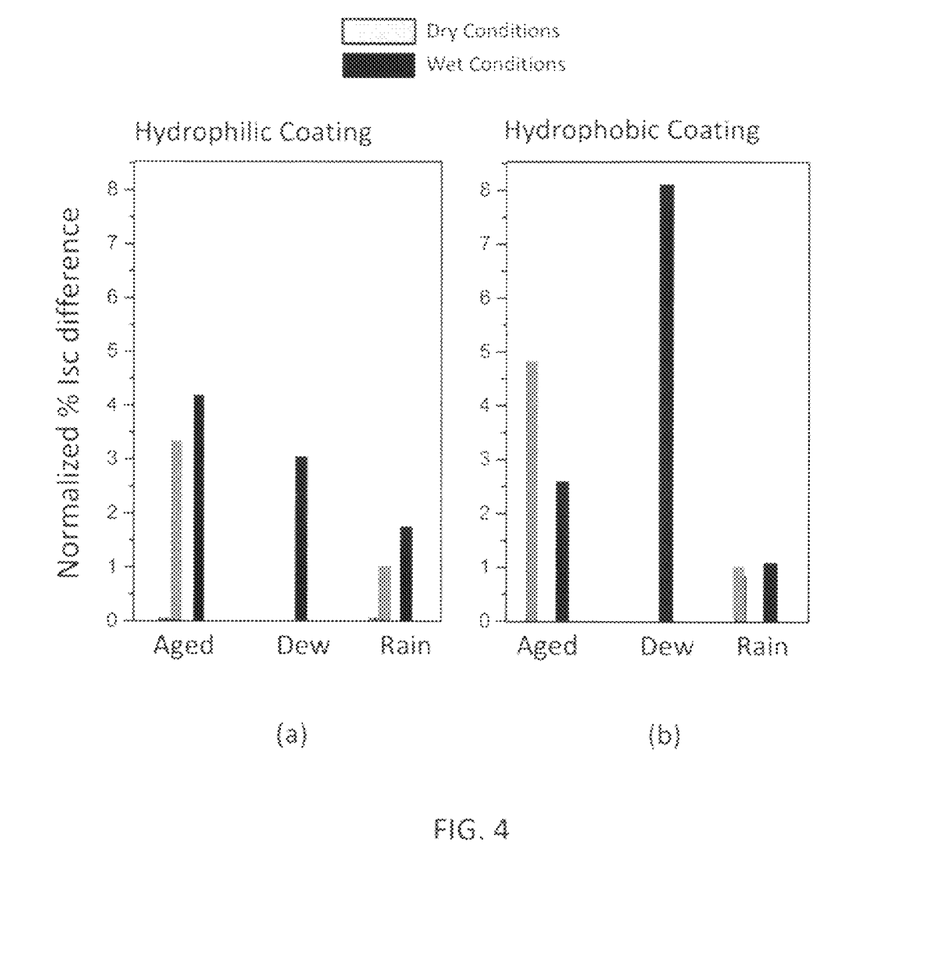
FIG. 4 depicts differences in short-circuit currents at various stages of an accelerated soiling test method for PV module surface portions comprising (a) a hydrophilic surface coating and (b) a hydrophobic surface coating, according to an embodiment.

FIG. 4 depicts differences in short-circuit currents at various stages of an accelerated soiling testing method for PV module test coupons comprising (a) a hydrophilic surface coating and (b) a hydrophobic surface coating according to an embodiment. In FIG. 4(*a*), normalized % Isc differences are plotted for a first hydrophilic surface portion tested under dry conditions (gray bars) and a second hydrophilic surface portion tested under wet conditions (black bars). For dry testing conditions, a normalized % Isc difference in an aged state and a normalized % Isc difference in a recovered state are plotted.

In FIG. 4(*b*), normalized % Isc differences are plotted for a first hydrophobic surface portion tested under dry conditions (gray bars) and a second hydrophobic surface portion tested under wet conditions (black bars). For wet testing conditions, a normalized % Isc difference in an aged state, a normalized % Isc difference after a dew event and a normalized % Isc difference in a recovered state, or after a rain event are plotted.

A normalized % Isc difference is zero for a complete recovery of a PV module surface portion. A higher normalized % Isc difference signifies a lower extent of recovery. From FIG. 4, a lower extent of recovery is observed under wet conditions. Additionally, hydrophobic coatings are especially susceptible to soiling-induced power losses after dew events as observed by the highest normalized % Isc difference in FIG. 4(*b*).

Figure 5:
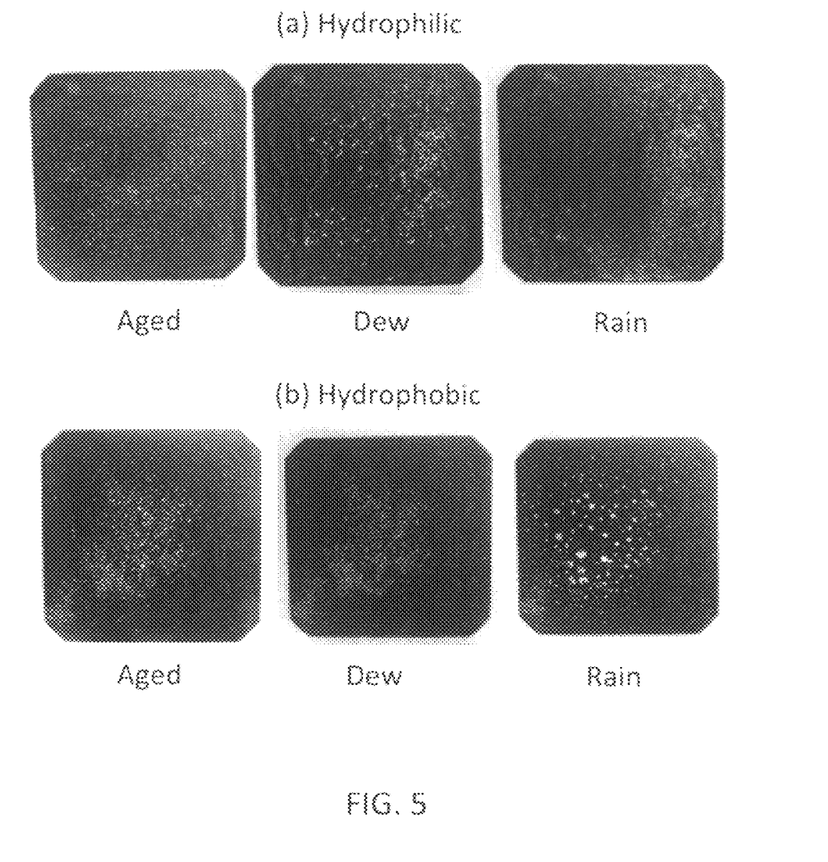
FIG. 5 exhibits photographs of PV module surface portions comprising (a) a hydrophilic surface coating and (b) a hydrophobic surface coating at various stages of an accelerated soiling testing method under wet conditions according to an embodiment.

FIG. 5 exhibits photographs of PV module surface portions comprising (a) a hydrophilic surface coating and (b) a hydrophobic surface coating at various stages of an accelerated soiling testing method under wet conditions, according to an embodiment. In general, tortuous soil incrustations are observed after aging for a hydrophilic surface portion coating (photograph at left of FIG. 5(*a*)) and hydrophobic surface portion coatings (photograph at left of FIG. 5(*b*)). As observed in the photograph at the right of FIG. 5(*a*), a specked accumulation, or canyon-like accumulation from water drops rolling down the surface, remains on the hydrophilic surface portion in a recovered state (e.g. after a rain event). In the photograph at the right of FIG. 5(*b*), large droplet accumulations remain on the hydrophobic surface portion in a recovered state (e.g. after a rain event).

The above specification and examples provide a complete description of the structure and use of illustrative embodiments. Although certain embodiments have been described above with a certain degree of particularity, or with reference to one or more individual embodiments, those skilled in the art could make numerous alterations to the disclosed embodiments without departing from the scope of this invention. As such, the various illustrative embodiments of the methods and systems are not intended to be limited to the particular forms disclosed. Rather, they include all modifications and alternatives falling within the scope of the claims, and embodiments other than the one shown can include some or all of the features of the depicted embodiment. For example, elements can be omitted or combined as a unitary structure, and/or connections can be substituted. Further, where appropriate, aspects of any of the examples described above can be combined with aspects of any of the other examples described to form further examples having comparable or different properties and/or functions, and addressing the same or different problems. Similarly, it will be understood that the benefits and advantages described above can relate to one embodiment or can relate to several embodiments. For example, embodiments of the present methods and systems can be practiced and/or implemented using different structural configurations, materials, and/or control manufacturing steps. The claims are not intended to include, and should not be interpreted to include, means-plus- or step-plus-function limitations, unless such a limitation is explicitly recited in a given claim using the phrase(s) "means for" or "step for," respectively.

The invention claimed is:

1. A method for accelerated soiling testing of a photovoltaic (PV) module, the method comprising the steps of:
    mixing a first percentage of a sand material and a second percentage of a water uptake material to form a soiling mixture;
    measuring a short-circuit current of the surface portion of a PV module in an initial state;
    spreading a predetermined amount of the soiling mixture on the surface portion of a PV module with an applicator, wherein the surface portion of a PV module is characterized by an initial degree of surface dryness;
    aging the surface portion of the PV module in a climatic chamber set at a predetermined temperature and relative humidity;
    exposing the surface portion of the PV module to a simulated environmental recovery condition to put the surface portion of the PV module into a recovered state;
    measuring a short-circuit current of the surface portion of a PV module in a recovered state;
    determining an extent of recovery of the surface portion of the PV module, wherein the extent of recovery is determined from the short-circuit current measurement of the surface portion of a PV module in the initial state and the short-circuit current measurement of the surface portion of a PV module in a recovered state.

2. The method according to claim 1, wherein the water uptake material comprises clay minerals selected from the group of montmorillonite, kaolinite, illite, smectite and vermiculite or a combination thereof.

3. The method according to claim 1, wherein the water uptake material is combined with silt or ash.

4. The method according to claim 1, wherein the water uptake material has a surface area greater than 5 $m^2\ g^{-1}$.

5. The method according to claim 1, wherein the simulated environmental recovery condition is a wind condition, a rain condition, a dew formation condition, or a combination thereof.

6. A method for accelerated soiling testing of a PV module, the method comprising the steps of:
    measuring an electrical property of the surface portion of a PV module in an initial state;
    depositing a soiling mixture on the surface portion of a PV module;
    aging the surface portion of the PV module by exposing the surface portion of the PV module to a simulated environmental aging condition;
    exposing the surface portion of the PV module to a simulated environmental recovery condition to put the surface portion of the PV module into a recovered state;
    measuring an electrical property of the surface portion of a PV module in a recovered state;
    determining an extent of recovery of the surface portion of the PV module.

7. The method according to claim 6, further comprising preparing the surface portion of a PV module by drying the surface of a PV module to produce an initial dry surface state.

8. The method according to claim 6, further comprising preparing the surface portion of a PV module by wetting surface of a PV module to produce an initial wet surface state.

9. The method of claim 6, further comprising the step of mixing a sand material and a water uptake material to form the soiling mixture.

10. The method of claim 9, further comprising the step of measuring the infrared spectrum of the soiling mixture using infrared spectroscopy.

11. The method of claim 6, wherein the step of depositing a soiling mixture on the surface portion of a PV module comprises spreading the soiling mixture with an applicator, thereby increasing the penetration of the mixture within the porosity of the surface of the PV module.

12. The method of claim 6, wherein aging the surface portion of the PV module further comprises tilting the surface portion of the PV module to a predetermined degree from horizontal.

13. The method of claim 6, wherein exposing the surface portion of the PV module to a simulated environmental recovery condition comprises exposing the surface portion of the PV module to a simulated wind condition.

14. The method of claim 6, wherein exposing the surface portion of the PV module to a simulated environmental recovery condition comprises exposing the surface portion of the PV module to a simulated a rain condition.

15. The method of claim 6, wherein exposing the surface portion of the PV module to a simulated environmental recovery condition comprises exposing the surface portion of the PV module to a simulated a dew formation condition.

16. The method of claim 6, wherein determining the extent of recovery of the surface portion of the PV module comprises measuring a current during a short-circuit state of a PV module.

17. The method of claim 6, wherein determining the extent of recovery of the surface portion of the PV module comprises measuring light transmittance through the surface portion of the PV module.

* * * * *